United States Patent
Lee et al.

(10) Patent No.: US 8,035,317 B2
(45) Date of Patent: Oct. 11, 2011

(54) OPTOCOUPLER SYSTEM WITH REDUCED POWER CONSUMPTION AND PULSE WIDTH DISTORTION

(75) Inventors: Kah Weng Lee, Singapore (SG); Fun Kok Chow, Singpore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 429 days.

(21) Appl. No.: 12/394,025

(22) Filed: Feb. 26, 2009

(65) Prior Publication Data

US 2010/0213874 A1    Aug. 26, 2010

(51) Int. Cl.
| | |
|---|---|
| *G05F 1/00* | (2006.01) |
| *H05B 37/02* | (2006.01) |
| *H05B 39/04* | (2006.01) |
| *H02M 1/14* | (2006.01) |
| *H02M 1/12* | (2006.01) |
| *H01L 31/00* | (2006.01) |
| *H03F 3/45* | (2006.01) |
| *G01R 19/00* | (2006.01) |
| *G11C 7/00* | (2006.01) |
| *H03K 5/22* | (2006.01) |

(52) U.S. Cl. ............ 315/302; 363/41; 327/514; 327/56; 327/90

(58) Field of Classification Search ................... 315/302; 363/41; 327/514, 56, 90
See application file for complete search history.

(56) References Cited

U.S. PATENT DOCUMENTS

| | | | |
|---|---|---|---|
| 6,373,045 B1 | 4/2002 | Bray | |
| 7,250,806 B2 * | 7/2007 | Zhang | ........................ 327/513 |
| 7,265,631 B2 | 9/2007 | Kwa et al. | |
| 2007/0115068 A1 | 5/2007 | Chow | |

FOREIGN PATENT DOCUMENTS

DE           3135491 A1    9/1991

* cited by examiner

*Primary Examiner* — Jacob Y Choi
*Assistant Examiner* — Henry Luong

(57) ABSTRACT

According to one embodiment, there is provided an optocoupler system configured to generate current signals having high, low and no amplitude portions in response to the receipt of logic high and low input signals. The varying amplitude portions of the current signals are used to drive other portions of the isolation circuitry, and result in reduced power consumption and dissipation, as well as reduced pulse width distortion.

31 Claims, 4 Drawing Sheets

OPTOCOUPLER SYSTEM WITH REDUCED POWER CONSUMPTION AND PULSE WIDTH DISTORTION

FIELD OF THE INVENTION

Various embodiments of the invention described herein relate to the field of optocouplers, and components, devices, systems and methods associated therewith.

BACKGROUND

Optocoupler systems are commonly employed to transfer signals between the same or different circuits, such as, by way of example, a transmitter and a receiver. A short optical transmission path is typically employed to transfer such signals between the circuit(s) while maintaining electrical isolation since the signals are converted from an electrical form to an optical form, and then back to electrical form by the optocoupler. A typical optocoupler employs an LED as a light source, which is driven by an input signal provided to the optocoupler and its corresponding driver circuit. Light signals corresponding to the input signal are provided by the LED to a photodiode across an electrical isolation gap, which in turn is operably coupled to an output circuit.

Some optocoupler systems are known to exhibit relatively high current consumption, especially with respect to the photodiode portions thereof. Moreover, it is not uncommon for pulse width distortion to occur in signals output by optocoupler systems. What is needed is an optocoupler system featuring reduced power dissipation and reduced pulse width distortion.

SUMMARY

In some embodiments, there is provided a method of reducing power dissipation and reducing pulse width distortion in an optocoupler system comprising providing an input signal having high and low states to the optocoupler system generating first and second current signals corresponding to the high and low states of the input signal, the first current signal comprising high and low portions, the second current signal comprising high and null portions, generating, with a light source, first and second light signals corresponding to the respective high, low and null portions of the first and second current signals, generating, with a light detector operably configured in respect of the light source, first and second light detector current signals corresponding to the respective high, low and null portions of the first and second light signals, converting the first and second light detector current signals into first and second voltage signals having respective high, low and null portions corresponding to the respective high, low and null portions of the first and second current signals, reproducing the high and low states of the input signal at an output of the optocoupler system using the first and second voltage signals and the respective high, low and null portions corresponding thereto.

In other embodiments there is provided an optocoupler system comprising a current driver logic circuit configured to receive an input signal having high and low states and to output first and second control signals corresponding to such high and low states, a first current source configured to receive the first and second control signals and to output respective first and second current signals corresponding thereto, the first current signal comprising high and low portions, the second current signal comprising high and null portions, a light source configured to receive the first and second current signals and to generate first and second light signals corresponding to the respective high, low and null portions thereof, a light detector operably configured in respect of the light source to generate first and second light detector current signals corresponding to the respective high, low and null portions of the first and second light signals, a transimpedance amplifier configured to receive the first and second light detector current signals and convert such signals into first and second voltage signals having respective high, low and null portions corresponding to the respective high, low and null portions of the first and second current signals, a first reference amplifier configured to generate a high reference voltage corresponding to the high state of the input signal, a second reference amplifier configured to generate a low reference voltage corresponding to the low state of the input signal, a first comparator configured to receive the first and second voltage signals and compare same to the high reference voltage, and to generate a first comparator signal on the basis of such comparison, a second comparator configured to receive the first and second voltage signals and compare same to the low reference voltage, and to generate a second comparator signal on the basis of such comparison, a detection logic circuit configured to receive the first and second comparator signals, and to generate a detection logic signal on the basis of comparing such signals, and a driver configured to receive the detection logic signal and produce a driver signal on the basis thereof, the driver and detection logic circuit together being configured to reproduce substantially the input signal.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTION OF SOME PREFERRED EMBODIMENTS

Figure 1:
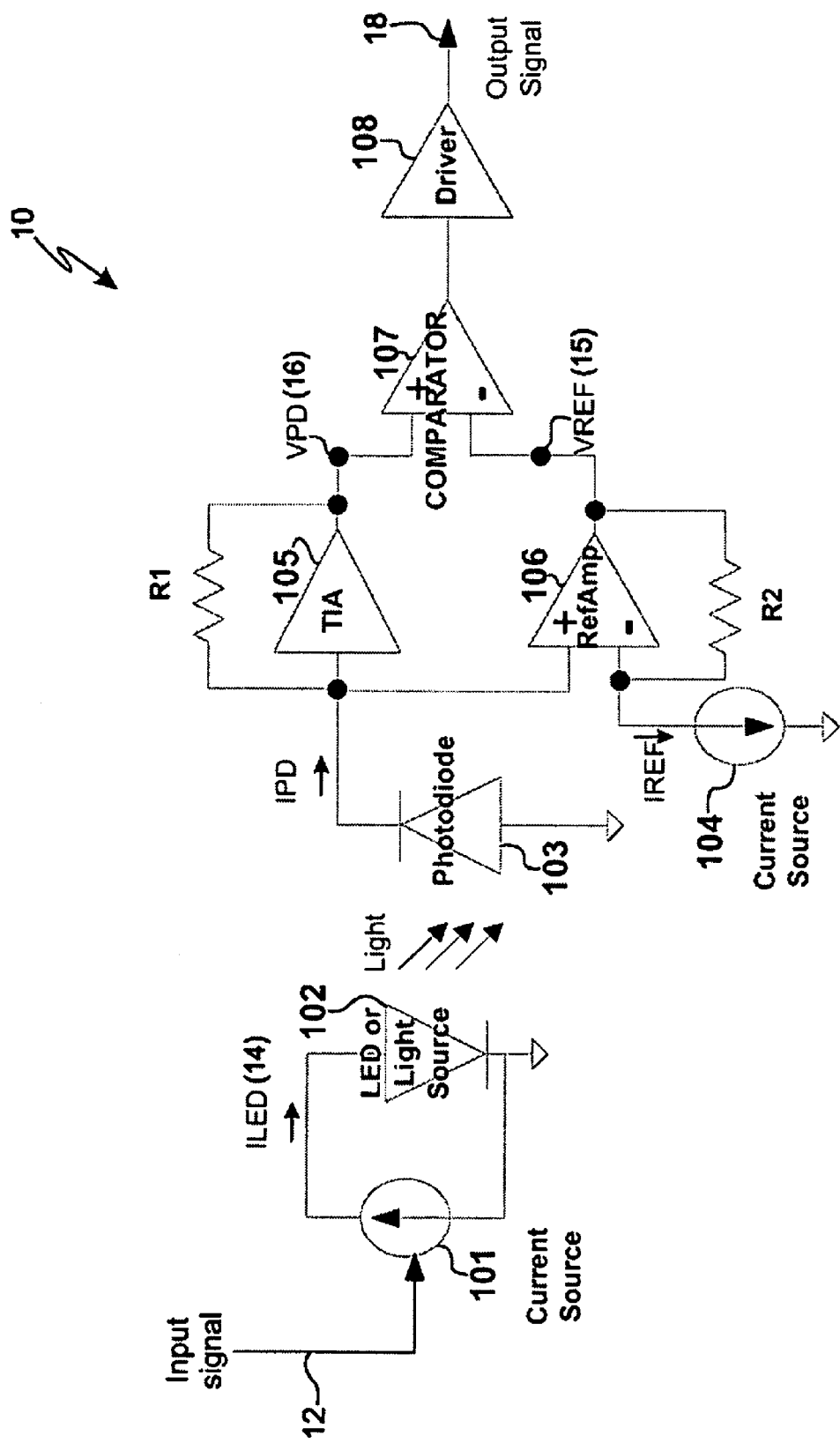
FIG. 1 shows an optocoupler circuit of the prior art.

A block diagram of a conventional optocoupler system 10 of the prior art is shown in FIG. 1. When input signal 12 is in a high state, current source 101 generates current ILED, which actuates LED or light source 102 and causes light to be emitted therefrom. The light generated by LED or light source 102 is captured by photodetector or photodiode 103 and converted to photodiode current IPD. Photodiode current IPD is converted into a voltage VPD at the output of transimpedance amplifier 105 when current IPD flows through resistor R1. Voltage VPD is then compared with VREF at the input of comparator 107. If the value of VPD is greater than VREF, comparator 107 outputs a high signal. If the value of VPD is less than VREF, comparator 107 outputs a low signal. Voltage VREF is the voltage at the input of comparator 107 when current IREF (which is generated by current source 104)

flows through resistor R2. Voltage VREF is a threshold voltage that determines whether a high or low signal is to be provided at the output of comparator 107. Driver 108 increases the driving capability of the signal provided at the output of comparator 107.

Figure 2:
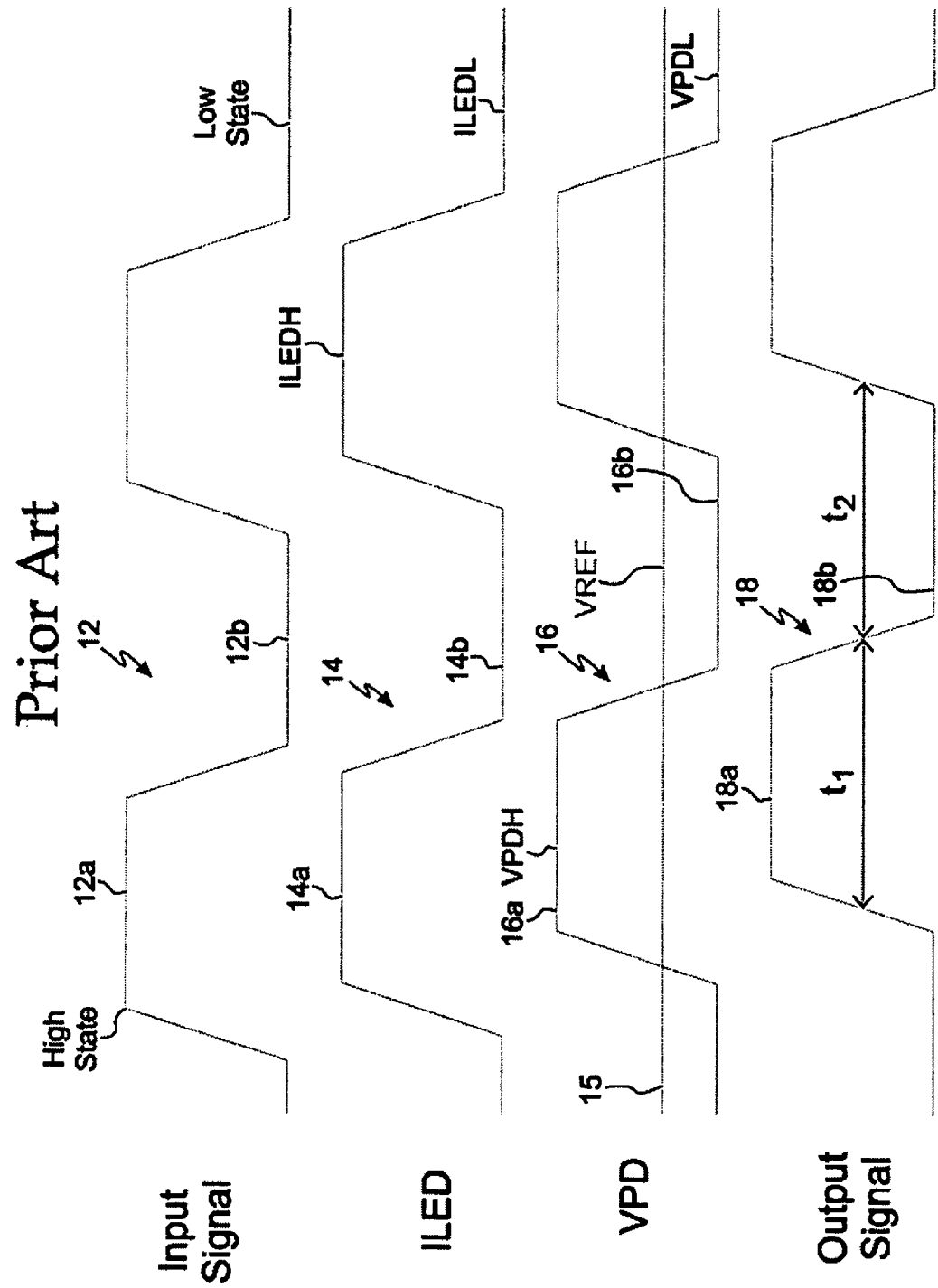
FIG. 2 shows signals input to, and generated and output by, the system of FIG. 1.

Referring now to FIG. 2, there are shown signals input to, and generated and output by, system 10 of FIG. 1. In FIG. 2, input signal 12 is denoted by 12a and 12b, which correspond to the high and low states of input signal 12, respectively. Reference numerals 14a and 14b denote high and low currents provided to light source 102, which correspond to the high and low states of the ILED (i.e., ILEDH and ILEDL, respectively). The high and low voltages generated by transimpedance amplifier 105 are denoted by 16a and 16b. The output signals provided by comparator 107 and/or driver 108 are denoted by 18a and 18b, which correspond to the high and low states of the output signal provided by system 10. Optimally, output signal 18 provided by system 10 mimics and reproduces faithfully the amplitude, phase and frequency of input signal 12.

System 10 illustrated in FIG. 1 has two primary disadvantages, which are illustrated as follows. In a first scenario, LED 102 is turned on or off by current source 101 to generate photodiode current IPD. The action of turning LED 102 on and off is determined by input signal 12. If input signal 12 is high and LED 102 is turned on in consequence, a significant amount of current flows into LED 102. If LED 102 remains turned on for a prolonged period of time, current is continuously injected into LED 102. As a result, during a single period of a 50% duty cycle, LED 102 can consume half the total value of ILED. For example, if LED current ILED is ILEDH when input signal 12 is in a high state and ILEDH equals 6 mA, over a 50% duty cycle signal LED 102 consumes about 3 mA per period. As a result, optocoupler system 12 illustrated in FIGS. 1 and 2 consumes and dissipates significant amounts of current.

In a second scenario, when input signal 12 switches between high and low states LED 102 is turned on or off. Light is generated when LED 102 is turned on, which in turn is detected by photodiode or light detector 103. This light is converted into current IPD by photodiode 103. Current IPD is next converted into a voltage by transimpedance amplifier 105 and compared to a fixed reference voltage VREF. Due to the characteristics of photodiode 103 and transimpedance amplifier 105, however, the rise and fall times of IPD may not be the same. Moreover, VREF is not fixed at the center of the range of VPD to permit compensation for the degradation of light output and performance of LED 102 that occurs over time. As shown in FIG. 2, $t_1$ (the duration of time between the rising and falling edges of the pulses of input signal 12) and $t_2$ (the duration of time between the falling and rising edges of the pulses of input signal 12) can differ from one another significantly. As a result, optocoupler system 12 of FIG. 1 can result in large pulse width distortion. The first and second scenarios outlined above can therefore result in high power consumption and/or dissipation, and significant pulse width distortion.

Figure 3:
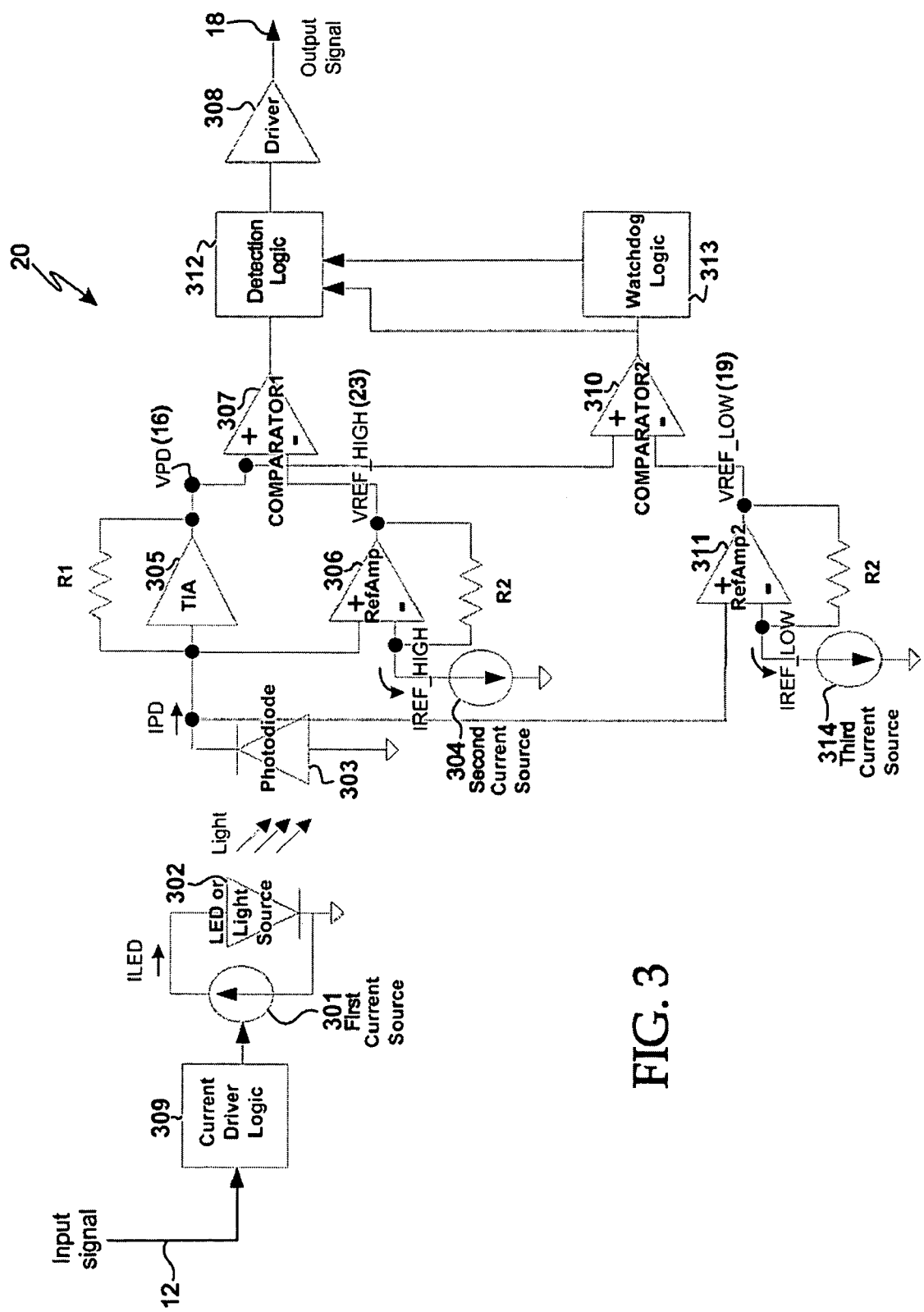
FIG. 3 shows one embodiment of an optocoupler system 20.
Figure 4:
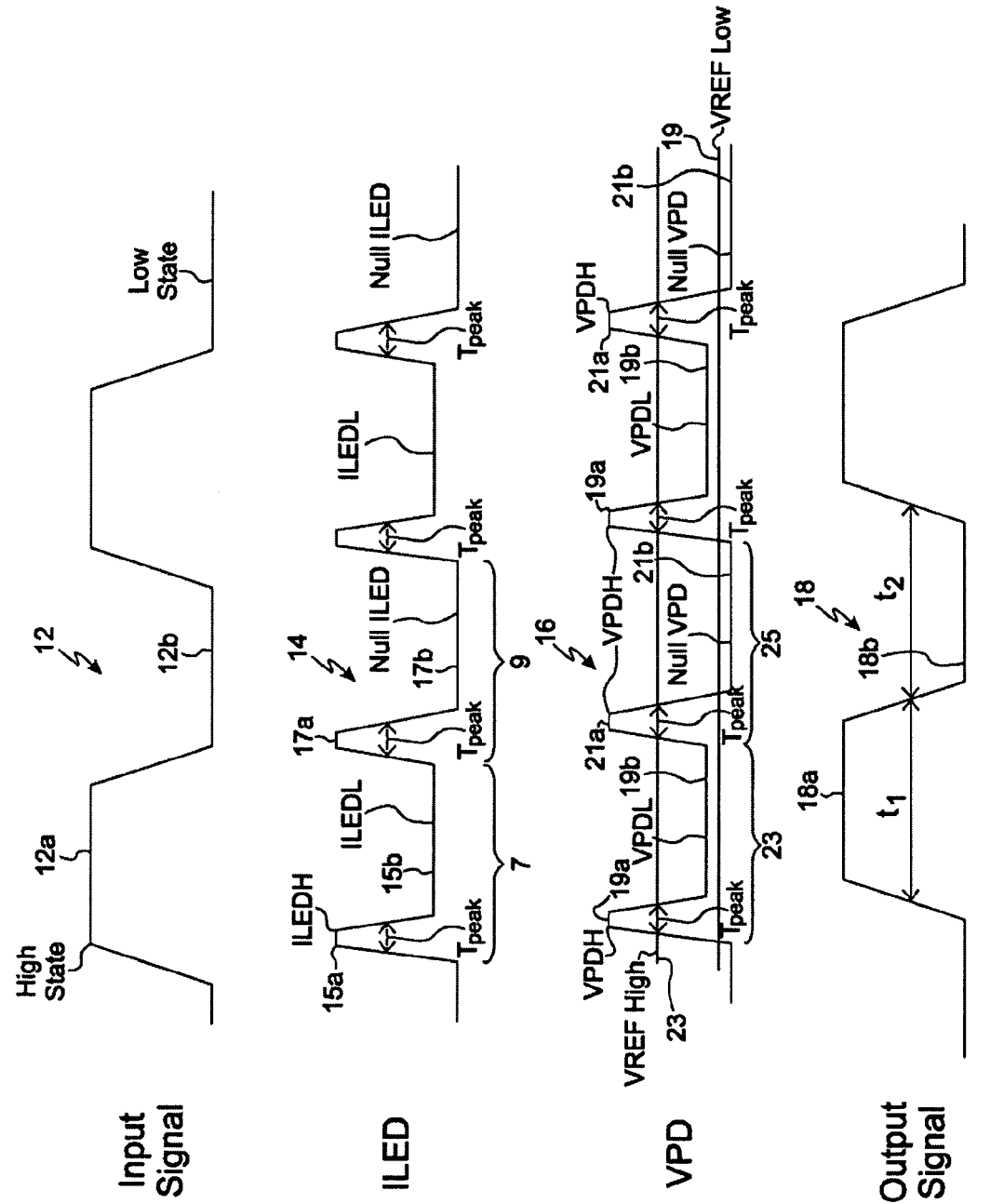
FIG. 4 shows signals input to, and generated and output by, the system of FIG. 3.

Referring now to FIGS. 3 and 4, there is shown one embodiment of novel optocoupler system 20, and the signals generated thereby. System 20 is configured to implement a new coding scheme which overcomes the above two principal disadvantages of prior art optocoupler system 10 shown in FIG. 1. As shown in FIG. 3, current driver logic circuit 309 is configured to receive input signal 12 having high and low states 12a and 12b (see FIG. 4) and to output first and second control signals corresponding to such high and low states. First current source 301 is configured to receive the first and second control signals and to output respective first and second current signals corresponding thereto, the first current signal comprising high and low portions 15a (ILEDH) and 15b (ILEDL), respectively, the second current signal comprising high and null or zero portions 17a (ILEDH) and 17b (Null LED). Light source 302, which in a preferred embodiment is an LED but may be any suitable light emitter, is configured to receive the first and second current signals and to generate first and second light signals 7 and 9 corresponding to the respective high, low and null portions thereof. See high and low portions 15a and 15b, and high and null or zero portions 17a and 17b, of ILEDH, ILEDL and Null LED signals forming signals 7 and 9 illustrated in FIG. 4.

Light detector 303, which in a preferred embodiment is a photodiode but may be any suitable photodetector, is operably configured in respect of light source 301 to generate first and second light detector current signals corresponding to the respective high, low and null portions of the first and second light signals. Transimpedance amplifier 305 is configured to receive the first and second light detector current signals and convert such signals into first and second voltage signals 23 and 25 having respective high, low and null portions corresponding to the respective high, low and null portions of the first and second current signals. See high and low portions 19a and 19b, and high and null or zero portions 21a and 21b, of VPD illustrated in FIG. 4.

First reference amplifier 306 is configured to generate high reference voltage VREF_High (23), which corresponds to high state 12a of input signal 12. Second reference amplifier 311 is configured to generate low reference voltage VREF_Low (19). First comparator 307 is configured to receive first and second voltage signals 23 and 25 and compare same to the VREF_High (23), and to generate a first comparator signal on the basis of such comparison. Second comparator 310 is configured to receive first and second voltage signals 23 and 25 and compare same to VREF_Low (19), and to generate a second comparator signal on the basis of such comparison. Detection logic circuit 312 is configured to receive the first and second comparator signals, and to generate a detection logic signal on the basis of comparing such signals. Driver 308 is configured to receive the detection logic signal and produce a driver signal on the basis thereof, where in a preferred embodiment driver 308 and detection logic circuit 312 are configured to reproduce substantially the amplitude, phase and frequency of input signal 12.

Continuing to refer to FIGS. 3 and 4, when current driver logic circuit 309 receives input signal 12 in a high state 12a, circuit 309 is configured to send a first control signal to current source 301 to trigger the output of first current signal 7 to light source or LED 302. When current driver logic circuit 309 receives input signal 12 in a low state 12b, circuit 309 is configured to send a second control signal to current source 301 to trigger the output of a second current signal 9 to light source or LED 302. As shown in FIG. 4, first current signal 7 comprises high and low portions 15a and 15b, where high portion 15a (or ILEDH) has a duration of $T_{peak}$ followed by low portion 15b (or ILEDL). High portion 15a or ILEDH is characterized by relatively high current consumption, while low portion 15b or ILEDL is characterized by relatively low power consumption. As further shown in FIG. 4, second current signal 9 comprises high and null or zero portions 17a and 17b, where high portion 17a (or ILEDH) has a duration of $T_{peak}$ followed by null or zero portion 17b (or Null ILED). High portion 17a or ILEDH is characterized by relatively high current consumption, while null or zero portion 17b or Null ILED is characterized by substantially no or very low power consumption.

Comparison of FIG. 3 to FIG. 1 shows that RefAmp2 (311) and third current source 314 are added to system 10 to produce a VREF_LOW (19) in improved system 20, which is of lower amplitude than VREF_HIGH (23). RefAmp2 and third current source 314 set a reference point for comparator2 (310) to permit detection of low portion 15b of first current signal 7. This reference point voltage (VREF_Low or 19) is routed to watchdog logic circuit 313, which is configured to monitor first current signal 7, and to send a signal to inform detection logic circuit 312 whether or not first current signal 7 has indeed been correctly detected. Detection logic circuit 312 receives signals from comparator1 (307), comparator2 (310), and the watchdog logic circuit 313, and outputs the proper signal corresponding to input signal 12. Watchdog circuit 313 is configured to check the output of comparator2 (310) at a predetermined interval of, for example, every microsecond. If the DC level output by comparator2 (301) detected by watchdog circuit 313 is correct, watchdog circuit 313 takes no action. If the DC level output by comparators (301) detected by watchdog circuit 313 is incorrect, however, watchdog circuit 313 sends a reset signal to detection logic circuit 312. In other words, watchdog circuit 313 monitors and corrects DC levels output by comparator2 (310).

One advantage of the coding scheme represented by system 20 in FIG. 3 and the waveforms shown in FIG. 4 is that the amount of current (ILED) consumed and/or dissipated by light source 302 LED current is reduced, which concomitantly reduces the amount of current (IPD) generated by photodetector 303. As described above, LED currents ILEDH, ILEDL and Null ILED are controlled by current logic driver 309.

Referring now to FIG. 4, the top signal represents input signal 12, followed by ILED current 14, VPD 16 (with VREF_HIGH or 17 and VREF_LOW or 19 superimposed thereon), and output signal 18. When input signal 12 is in a high state, current logic driver circuit 309 sends a first control signal to first current source 301. Two different values of ILED are generated by first current source 301 in response to receiving the first control signal: ILEDH (or 15a) and ILEDL (or 15b). When input signal 12 is in a low state, current logic driver circuit 309 sends a second control signal to first current source 301. Two different values of ILED are generated by first current source 301 in response to receiving the second control signal: ILEDH (or 17a) and Null ILEDL (or 17b).

As further shown in FIG. 3, ILEDH (15a or 17a) has greater amplitude than ILEDL (or 15b). Null ILED (or 17b) is characterized by little or no current consumption and/or dissipation. In one embodiment where light source 302 is an LED, ILEDH can be as high as 6 mA and ILEDL can be as low as 2 mA. Note that in another embodiment, the high portions of the first and second current signals have maximum amplitudes ranging between about 4 mA and about 20 mA, and the low portions of the first and second current signals have minimum amplitudes greater than or equal to about 0.5 mA or less than about 50% of the high portions of the first and second current signals. In the embodiment of system 20 illustrated in FIGS. 3 and 4, the rising edge of ILEDH determines the transition of the output. As shown in FIG. 3, ILEDH (15a or 17a) is a pulse that is provided over a relatively short duration of time $T_{peak}$. Consequently, if the high state of input signal 12 is maintained over a relatively long duration of time, the current ILED consumed and/or dissipated by light source 302 can be reduced significantly because most current provided to LED 302 is provided at a level of ILEDL (or 15b).

This advantageous result obtains because $T_{peak}$ is small compared to time period ti (which corresponds to the length of time input signal 12 is in a high state). If input signal 12 is maintained in a low state for a relatively long duration of time, the current ILED consumed and/or dissipated by light source 302 is essentially reduced to zero because most current provided to LED 302 is provided at a level of Null ILEDL (or 17b). This is because $T_{peak}$ is small compared to time period $t_2$ (which corresponds to the length of time input signal 12 is in a low state).

Continuing to refer to FIGS. 3 and 4, the voltage at the output of transimpedance amplifier 305, VPD (16), changes according to the level of photodiode current IPD provided thereto. For example, VPDH is generated as an output by transimpedance amplifier 305 when first current source 301 sends a current of ILEDH to light source or LED 302. ILEDH is converted to light which is received by photodiode 303 and used to generate photodiode current IPD.

The novel coding scheme disclosed herein permits LED or light source 302 to consume and dissipate less current owing to $T_{peak}$ of ILEDH 15a and 17a being small in comparison to the durations of ILEDL and Null LED, especially at low frequencies. It will now be seen that LED or light source 302 consumes only slightly more than about ILEDL 15b when input signal 12 is in a high state. When input signal 12 is in a low state, light source 302 consumes only slightly more than Null ILED 17b, which in one embodiment is slightly less than no current at all. Thus, over a single period of a 50% duty cycle, LED 302 consumes only slightly more than half ILEDL 15b. By way of example, if ILEDH 15a is 6 mA and ILEDL 15b is 2 mA, LED 302 consumes about 1mA over a single period of a 50% duty cycle. As mentioned above, reductions in current and power become more prominent at lower frequencies.

Further as shown in FIG. 4, output signal 18 depends only on the rising edge of VPDH 19a. The rising edge of output signal 18 is triggered when the rising edge of VPDH 19a crosses VREF_HIGH 21. The falling edge of output signal 18 is triggered when the next rising edge of VPDH 21 a crosses VREF_HIGH 21 again. Because transitions for output signal 18 are determined by leading rising edges only, the problems caused by different rise and fall times and slopes of leading and falling edges of pulses generated by transimpedance amplifier 305, and the deleterious effects they can produce on thresholds associated with VREF_High (23) are essentially eliminated. As a result, pulse width distortion is reduced.

In summary, system 20 illustrated in FIGS. 3 and 4 reduces power consumption and/or dissipation because the overall current ILED is reduced. This effect becomes more pronounced at lower frequencies. Pulse width distortion is also reduced because pulse transitions are triggered by leading edges only.

Note that included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

The invention claimed is:

1. A method of reducing power dissipation and reducing pulse width distortion in an optocoupler system, comprising:
   providing an input signal having high and low states to the optocoupler system;

generating first and second current signals corresponding to the high and low states of the input signal, the first current signal comprising high and low portions, the second current signal comprising high and null portions;

generating, with a light source, first and second light signals corresponding to the respective high, low and null portions of the first and second current signals;

generating, with a light detector operably configured in respect of the light source, first and second light detector current signals corresponding to the respective high, low and null portions of the first and second light signals;

converting the first and second light detector current signals into first and second voltage signals having respective high, low and null portions corresponding to the respective high, low and null portions of the first and second current signals;

reproducing the high and low states of the input signal at an output of the optocoupler system using the first and second voltage signals and the respective high, low and null portions corresponding thereto.

2. The method of claim 1, further comprising generating a high reference voltage corresponding to the high state of the input signal and generating a low reference voltage corresponding to the low state of the input signal.

3. The method of claim 2, further comprising comparing the first and second voltage signals to the high reference voltage and generating a first comparator signal on the basis of thereof.

4. The method of claim 3, further comprising comparing the first and second voltage signals to the low reference voltage and generating a second comparator signal on the basis thereof.

5. The method of claim 4, further comprising generating a detection logic signal on the basis of comparing the first and second comparator signals.

6. The method of claim 5, further comprising employing a driver circuit and the detection logic circuit to reproduce substantially the input signal.

7. The method of claim 6, further comprising further employing a watchdog logic circuit to receive and process the second comparator signal and provide an output signal to the detection logic circuit.

8. The method of claim 1, further comprising providing the input signal as a series of pulses, where each pulse is characterized by a maximum amplitude corresponding to the high state, and durations of time in between the pulses are characterized by the low state.

9. The method of claim 8, wherein transitions from the low state to the high state for each of the pulses results in the generation of high portions having durations of time $T_{peak}$ followed by low portions.

10. The method of claim 9, wherein at least some pulses have a time period of about $t_1$, durations of time between at least some adjoining pulses are each about $t_2$, and $T_{peak}$ is less than $t_1$ $_{or}$ and $t_2$.

11. The method of claim 8, wherein transitions from the high state to the low state for each of the pulses results in the generation of high portions having durations of time $T_{peak}$ followed by null portions.

12. The method of claim 11, wherein at least some pulses have a time period of about $t_1$, durations of time between at least some adjoining pulses are each about $t_2$, and $T_{peak}$ is less than $t_1$ $_{or}$ and $t_2$.

13. The method of claim 8, wherein transitions from the low state to the high state for each of the pulses results in the generation of high portions having durations of time $T_{peak}$ followed by low portions, and transitions from the high state to the low state for each of the pulses results in the generation of high portions having durations of time $T_{peak}$ followed by null portions, thereby minimizing pulse width distortion.

14. The method of claim 1, wherein the high portion of the first current signal (ILEDH) has a maximum amplitude ranging between about 4 mA and about 20 mA.

15. The method of claim 1, wherein the low portion of the first current signal (ILEDL) has a minimum amplitude greater than or equal to about 0.5 mA or less than about 50% of the high portion of the first current signal (ILEDH).

16. The method of claim 1, wherein a first duration of time corresponding to the high portion is less than a second duration of time corresponding to the low portion.

17. The method of claim 1, wherein current consumed by the light source during the null portions is about zero.

18. An optocoupler system, comprising:
a current driver logic circuit configured to receive an input signal having high and low states and to output first and second control signals corresponding to such high and low states;
a first current source configured to receive the first and second control signals and to output respective first and second current signals corresponding thereto, the first current signal comprising high and low portions, the second current signal comprising high and null portions;
a light source configured to receive the first and second current signals and to generate first and second light signals corresponding to the respective high, low and null portions thereof;
a light detector operably configured in respect of the light source to generate first and second light detector current signals corresponding to the respective high, low and null portions of the first and second light signals;
a transimpedance amplifier configured to receive the first and second light detector current signals and convert such signals into first and second voltage signals having respective high, low and null portions corresponding to the respective high, low and null portions of the first and second current signals;
a first reference amplifier configured to generate a high reference voltage corresponding to the high state of the input signal;
a second reference amplifier configured to generate a low reference voltage corresponding to the low state of the input signal;
a first comparator configured to receive the first and second voltage signals and compare same to the high reference voltage, and to generate a first comparator signal on the basis of such comparison;
a second comparator configured to receive the first and second voltage signals and compare same to the low reference voltage, and to generate a second comparator signal on the basis of such comparison;
a detection logic circuit configured to receive the first and second comparator signals, and to generate a detection logic signal on the basis of comparing such signals, and
a driver configured to receive the detection logic signal and produce a driver signal on the basis thereof, the driver and detection logic circuit together being configured to reproduce substantially the input signal.

19. The system of claim 18, further comprising a watchdog logic circuit having an input configured to receive the second comparator signal and an output operably coupled to the detection logic circuit.

20. The system of claim 18, wherein the light source is an LED.

21. The system of claim 18, wherein the light detector is a photodiode.

22. The system of claim 18, wherein the input signal comprises a series of pulses, where each pulse is characterized by a maximum amplitude corresponding to the high state, and durations of time in between the pulses are characterized by the low state.

23. The system of claim 22, wherein transitions from the low state to the high state for each of the pulses results in the generation of high portions having durations of time $T_{peak}$ followed by low portions.

24. The system of claim 23, wherein at least some pulses have a time period of about $t_1$, durations of time between at least some adjoining pulses are each about $t_2$, and $T_{peak}$ is less than $t_1{}_{or}$ and $t_2$.

25. The system of claim 22, wherein transitions from the high state to the low state for each of the pulses results in the generation of high portions having durations of time $T_{peak}$ followed by null portions.

26. The system of claim 25, wherein at least some pulses have a time period of about $t_1$, durations of time between at least some adjoining pulses are each about $t_2$, and $T_{peak}$ is less than $t_1{}_{or}$ and $t_2$.

27. The system of claim 22, wherein transitions from the low state to the high state for each of the pulses results in the generation of high portions having durations of time $T_{peak}$ followed by low portions, and transitions from the high state to the low state for each of the pulses results in the generation of high portions having durations of time $T_{peak}$ followed by null portions, thereby minimizing pulse width distortion.

28. The system of claim 18, wherein the high portion of the first current signal (ILEDH) has a maximum amplitude ranging between about 4 mA and about 20 mA.

29. The system of claim 18, wherein the low portion of the first current signal (ILEDL) has a minimum amplitude greater than or equal to about 0.5 mA or less than about 50% of the high portion of the first current signal (ILEDH).

30. The system of claim 18, wherein a first duration of time corresponding to the high portion is less than a second duration of time corresponding to the low portion.

31. The system of claim 18, wherein current consumed by the light source during the null portions is about zero.

* * * * *